US009959558B2

(12) United States Patent
Glover et al.

(10) Patent No.: US 9,959,558 B2
(45) Date of Patent: May 1, 2018

(54) APPLICATION CARDS AS ADVERTISEMENTS

(71) Applicant: Samsung Electronics Co., Ltd., Suwon-si, Gyeonggi-do (KR)

(72) Inventors: Eric J. Glover, Palo Alto, CA (US); Jacob Orrin, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 14/828,967

(22) Filed: Aug. 18, 2015

(65) Prior Publication Data

US 2017/0053324 A1    Feb. 23, 2017

(51) Int. Cl.
*G06Q 30/00* (2012.01)
*G06Q 30/02* (2012.01)
*G06F 17/22* (2006.01)

(52) U.S. Cl.
CPC ..... *G06Q 30/0277* (2013.01); *G06F 17/2235* (2013.01); *G06F 17/2247* (2013.01); *G06Q 30/0276* (2013.01)

(58) Field of Classification Search
USPC .......... 705/14.4, 14.49, 14.72, 14.43, 14.73; 707/722
See application file for complete search history.

(56) References Cited

U.S. PATENT DOCUMENTS

| | | | | | |
|---|---|---|---|---|---|
| 5,717,923 | A | * | 2/1998 | Dedrick | ............ G06F 17/30702 |
| 5,848,396 | A | * | 12/1998 | Gerace | .................. G06Q 30/02 |
| | | | | | 705/14.49 |
| 5,991,735 | A | * | 11/1999 | Gerace | ................... G06Q 30/02 |
| | | | | | 705/7.29 |
| 7,853,700 | B2 | * | 12/2010 | Lee | ......................... G06Q 30/02 |
| | | | | | 705/7.29 |
| 7,962,604 | B1 | * | 6/2011 | Morris | .................. G06Q 30/02 |
| | | | | | 705/14.4 |
| 8,321,534 | B1 | * | 11/2012 | Roskind | ........... H04N 21/25808 |
| | | | | | 348/194 |

(Continued)

FOREIGN PATENT DOCUMENTS

KR    20130080716 A  *  7/2013
KR    20130115517 A  *  10/2013

*Primary Examiner* — Luis A Brown
(74) *Attorney, Agent, or Firm* — Jefferson IP Law, LLP

(57) ABSTRACT

A server includes a network communication device, a storage device, and a processing device that executes computer-readable instructions. When the computer-readable instructions are executed by the processing device, the computer-readable instructions cause the processing device to receive advertisement data that corresponds with a web advertisement. The advertisement data includes an advertisement uniform resource locator (URL) that refers to a website advertised by the web advertisement. In addition, the computer-readable instructions cause the processing device to determine an advertisement card object based on the advertisement data. The advertisement card object includes a card label, a card image, and graphical user interface (GUI) elements. The computer-readable instructions cause the processing device to render an advertisement card that displays the card label, the card image and the GUI elements, and transmit the advertisement card object via the network communication device.

20 Claims, 6 Drawing Sheets

(56) References Cited

U.S. PATENT DOCUMENTS

| | | | |
|---|---|---|---|
| 8,473,349 B1* | 6/2013 | Manber | G06Q 30/02 705/14.48 |
| 2001/0029525 A1* | 10/2001 | Lahr | G06F 17/30864 709/218 |
| 2002/0042738 A1* | 4/2002 | Srinivasan | G06Q 30/02 705/14.43 |
| 2003/0106022 A1* | 6/2003 | Goodacre | G06F 17/30905 715/226 |
| 2005/0096979 A1* | 5/2005 | Koningstein | G06Q 10/10 705/14.68 |
| 2005/0096980 A1* | 5/2005 | Koningstein | G06Q 30/00 705/14.41 |
| 2005/0235048 A1* | 10/2005 | Costa-Requena | H04L 29/06027 709/219 |
| 2006/0041474 A1* | 2/2006 | Westling | G06Q 30/02 705/14.39 |
| 2006/0074769 A1* | 4/2006 | Looney | G06Q 30/02 705/14.66 |
| 2006/0149624 A1* | 7/2006 | Baluja | G06Q 30/0255 705/14.53 |
| 2006/0271438 A1* | 11/2006 | Shotland | G06Q 30/02 705/14.46 |
| 2007/0022442 A1* | 1/2007 | Gil | G06F 17/30905 725/62 |
| 2007/0073585 A1* | 3/2007 | Apple | G06Q 30/02 705/14.46 |
| 2007/0300152 A1* | 12/2007 | Baugher | G06F 17/3089 715/210 |
| 2008/0092159 A1* | 4/2008 | Dmitriev | G06Q 30/0269 725/34 |
| 2010/0036717 A1* | 2/2010 | Trest | G06Q 30/0207 705/14.1 |
| 2010/0121710 A1* | 5/2010 | Chipman | G06Q 30/02 705/14.51 |
| 2010/0222040 A1* | 9/2010 | Bosan | G06Q 30/02 455/414.1 |
| 2011/0010245 A1* | 1/2011 | Priebatsch | G06Q 30/02 705/14.58 |
| 2012/0278722 A1* | 11/2012 | Raleigh | H04L 12/14 715/735 |
| 2012/0289147 A1* | 11/2012 | Raleigh | H04L 67/2847 455/3.06 |
| 2013/0018731 A1* | 1/2013 | Morris | G06Q 30/02 705/14.66 |
| 2013/0054366 A1* | 2/2013 | Roundtree | G06Q 30/0255 705/14.55 |
| 2013/0311300 A1* | 11/2013 | Scarborough | G06Q 30/02 705/14.69 |
| 2013/0325633 A1* | 12/2013 | McAfee | G06Q 30/02 705/14.68 |
| 2013/0337785 A1* | 12/2013 | Delug | H04W 4/003 455/414.1 |
| 2014/0250106 A1* | 9/2014 | Shapira | G06F 17/30864 707/722 |
| 2014/0282245 A1* | 9/2014 | Scarborough | G06F 3/04842 715/811 |
| 2014/0316890 A1* | 10/2014 | Kagan | G06Q 30/0256 705/14.54 |
| 2014/0373040 A1* | 12/2014 | Lin | H04N 21/4126 725/25 |
| 2015/0006719 A1* | 1/2015 | Gupta | H04L 67/16 709/224 |
| 2015/0019342 A1* | 1/2015 | Gupta | G06Q 30/0269 705/14.66 |
| 2015/0019714 A1* | 1/2015 | Shaashua | H04L 67/24 709/224 |
| 2015/0046255 A1* | 2/2015 | McAteer | G06Q 30/02 705/14.49 |
| 2015/0081904 A1* | 3/2015 | Guedalia | H04L 41/28 709/225 |
| 2015/0095160 A1* | 4/2015 | Ma | G06Q 30/0267 705/14.64 |
| 2015/0134436 A1* | 5/2015 | Lambert | G06Q 30/00 705/14.26 |
| 2015/0156266 A1* | 6/2015 | Gupta | H04L 67/12 709/224 |
| 2015/0170215 A1* | 6/2015 | McConnell | G06Q 30/0268 705/14.65 |
| 2015/0193546 A1* | 7/2015 | Lipton | G06F 8/61 717/178 |
| 2015/0201035 A1* | 7/2015 | Profit | H04L 67/2842 709/213 |
| 2015/0227633 A1* | 8/2015 | Shapira | G06F 17/30395 707/706 |
| 2015/0254367 A1* | 9/2015 | Kagan | G06F 3/0482 707/706 |
| 2015/0339716 A1* | 11/2015 | Guevremont | G06Q 30/0259 705/14.45 |
| 2015/0358777 A1* | 12/2015 | Gupta | H04L 12/2807 370/254 |
| 2015/0371263 A1* | 12/2015 | Kagan | G06Q 30/0256 705/14.54 |
| 2016/0007288 A1* | 1/2016 | Samardzija | H04W 52/0229 370/311 |
| 2016/0013980 A1* | 1/2016 | McKnight | H04L 41/0813 709/221 |
| 2016/0034957 A1* | 2/2016 | Kagan | G06Q 30/0256 705/14.54 |
| 2016/0063535 A1* | 3/2016 | Xu | G06Q 30/0241 705/14.4 |
| 2016/0085521 A1* | 3/2016 | Savliwala | G06F 17/30867 717/108 |
| 2016/0092919 A1* | 3/2016 | Coleman, Jr. | G06Q 30/0255 705/14.53 |
| 2016/0162555 A1* | 6/2016 | Shapira | G06F 17/30554 707/722 |
| 2016/0174266 A1* | 6/2016 | Goel | H04W 76/02 455/509 |
| 2016/0179962 A1* | 6/2016 | Patten | G06F 17/3053 707/706 |
| 2016/0197798 A1* | 7/2016 | Britt | H04W 4/005 370/254 |
| 2016/0205003 A1* | 7/2016 | Srinivasan | H04L 67/10 709/224 |
| 2016/0285979 A1* | 9/2016 | Wang | H04L 67/16 |
| 2016/0291914 A1* | 10/2016 | Yu | H04L 51/32 |
| 2016/0313893 A1* | 10/2016 | Xu | G06F 3/0481 |
| 2016/0357764 A1* | 12/2016 | Glover | G06F 17/3087 |
| 2016/0358215 A1* | 12/2016 | Glover | G06F 17/3087 |
| 2016/0358216 A1* | 12/2016 | Glover | G06F 17/3087 |
| 2016/0364759 A1* | 12/2016 | Glover | G06F 17/3087 |
| 2017/0053314 A1* | 2/2017 | Glover | G06Q 30/0267 |
| 2017/0103423 A1* | 4/2017 | Glover | G06Q 30/0267 |

* cited by examiner

```
490,
490-1  {
491   ——"card-label": "Pizza Hut®",
492   ——"card-image-src-": "https://...png",
493   ——"GUIelements": {
          "radio-button-1": "Meat Lovers®",
          "radio-button-2": "Veggie Lovers®",
          "drop-down-1": {
              "options": ["Pan Pizza", "Thin Crust"...],
              "default-value": "Pan Pizza"
          },
          "drop-down-2": {
              "options": ["Large", "Medium", "Small"]
              "default-value": "Large"
          },
          "submit-button": "Order"
      },
494   ——"executable-instructions": {...},
      }
```

220, 220-1 — 224
Pizza Hut®
226 — 2 mediums $6.99 ea. >
Dipper Pizza $12.99 >
228 {
  ○ Meat Lovers®
  ● Veggie Lovers®
  [Pan Pizza ∨] [Large ∨] [Order]
}

```
490,
490-2  {
491   ——"card-label": "Domino's Pizza®",
492   ——"card-image-src-": "https://...png",
493   ——"GUIelements": {...},
494   ——"executable-instructions": {...},
495,
495-2 ——"access-mechanism" {
          "type": "native-application",
          "application-name": "Domino's Pizza",
          "application-ID": "...",
      },
496   ——"card-layout": "https://..."
      }
```

220, 220-2 — 224
Domino's Pizza®
226 — CHOOSE $5⁹⁹ >
Any Two   ea
228 {
  [Order Last Order
  (Large Spinach & Feta Pizza)]
  [Open Native Application]
}

```
490,
490-3  {
491   ——"card-label": "Papa Johns®",
492   ——"card-image-src-": "https://...png",
493   ——"GUIelements": {...},
494   ——"executable-instructions": {...},
495,
495-3 ——"access-mechanism" {
          "type": "web",
          "web-URL": "PapaJohns.com",
      },
496   ——"card-layout": {...}
      }
```

220, 220-3 — 224
Papa Johns®
226 — [Enter Promo] [Apply]
Greek Pizza $12 >
228 {
  ○ The Meats  [1 ⇅][Lg $16 ∨]
  ● Garden Fresh  [Order]
  [Go To PapaJohns.com]
}

FIG. 2B

APPLICATION CARDS AS ADVERTISEMENTS

TECHNICAL FIELD

This disclosure relates to providing application cards as advertisements.

BACKGROUND

Some advertisement networks provide web advertisements in response to search queries. The advertisement networks send the web advertisements to computers that often display the web advertisements as user-clickable hyperlinks. When a user clicks on an advertised hyperlink, a website advertised by the web advertisement launches in a web browser. While web advertisements may be suitable for desktop computers where users often use the web browser, such web advertisements may not be desirable on mobile computing devices.

SUMMARY

An aspect of the disclosure provides a server. The server includes a network communication device, a storage device and a processing device. The storage device may store a card data store that stores card records. The card records may include a card identifier (ID) that identifies the card record. The card records may include a website uniform resource locator (URL) of a website associated with the card record. The card records may include a card label, a card image and information about graphical user interface (GUI) elements displayable on an application card. The processing device executes computer-readable instructions that, when executed by the processing device, cause the processing device to receive advertisement data corresponding with a web advertisement. The advertisement data may include an advertisement URL that refers to a website advertised by the web advertisement.

Upon receiving the advertisement data, the processing device determines an advertisement card object based on the advertisement data. The processing device may determine the advertisement card object by comparing the advertisement data with the card records stored in the card data store. The processing device selects a particular card record from the card data store based on the comparison. Upon selecting the card record, the processing device may construct a data container representing the advertisement card object. The data container may indicate the card label, the card image and the GUI elements stored in the selected card record. The processing device transmits the advertisement card object via the network communication device.

Another aspect of the disclosure provides a server. The server includes a network communication device, a storage device and a processing device. The storage device may store a card data store that stores card records. The processing device executes computer-readable instructions that, when executed by the processing device, cause the processing device to receive advertisement data corresponding with a web advertisement. The advertisement data may indicate an advertisement URL that refers to a website advertised by the web advertisement. The advertisement data may indicate an advertisement image and advertising text (e.g., a brand name or a trade name). The processing device compares the advertisement data with the card records stored in the card data store. The processing device may determine that the advertisement data does not match with the card records stored in the card data store.

In response to determining that the advertisement data does not match the card records stored in the card data store, the processing device may determine the advertisement card object based directly on the advertisement data. The processing device may determine a card image based on the advertisement image. The processing device may determine a card label based on the advertising text. The processing device may construct a data container representing an advertisement card object. The data container may include the card image and the card label. Upon constructing the advertisement card object, the processing device transmits the advertisement card object via the network communication device.

Another aspect of the disclosure provides a server. The server includes a network communication device and a storage device. The storage device includes a card data store that stores card records. The card records include a card identifier (ID) that identifies the card record. The card records may include a website uniform resource locator (URL) of a website associated with the card record. The card records may include a card label, a card image and information about graphical user interface (GUI) elements displayable on an application card. The network communication device may be configured to receive advertisement data corresponding with a web advertisement. The advertisement data may include an advertisement URL that refers to a website advertised by the web advertisement. The network communication device transmits an advertisement card object in response to receiving the advertisement data. The advertisement card object may indicate the card label, the card image and the GUI elements of at least one of the card records. The server includes means for determining the advertisement card object based on the advertisement data.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2B are schematic diagrams of example application cards and their corresponding card objects.

Like reference symbols in the various drawings indicate like elements.

DETAILED DESCRIPTION

Figure 1:
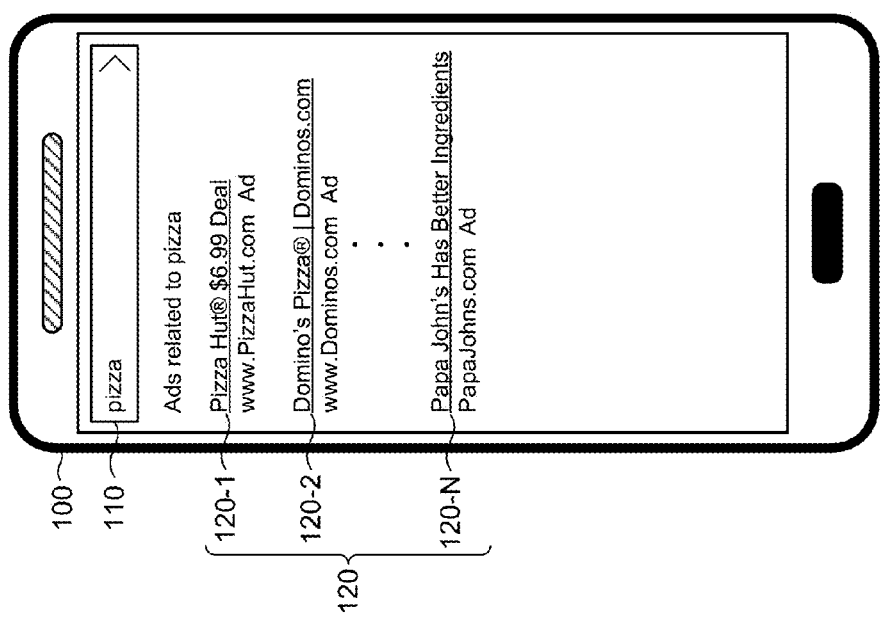
FIG. 1 is a schematic diagram of a mobile computing device displaying web ads.

FIG. 1 illustrates an example mobile computing device 100 that displays web-based advertisements (hereinafter, web ads). The mobile computing device 100 receives a search query 110 from a user of the mobile computing device 100. The mobile computing device 100 transmits the search query 110 to an advertisement (ad) server (not shown). In response to transmitting the search query 110, the mobile computing device 100 receives web ads 120 from the ad server. The web ads 120 are associated with advertised websites. For example, the web ad 120-1 is for the PizzaHut® website. Similarly, the web ad 120-2 is for the Dominos® website and the web ad 120-N is for the Papa Johns® website.

The mobile computing device 100 displays the web ads 120 as user-selectable links (e.g., hyperlinks). The mobile computing device 100 can receive a selection of a web ad 120 from the user. Upon receiving a selection of a web ad 120, the mobile computing device 100 displays the advertised website associated with the web ad 120 in a web browser. For example, upon receiving a selection of the web ad 120-1, the mobile computing device launches the web browser and automatically navigates to the PizzaHut® website (e.g., www.pizzahut.com). Similarly, when the user clicks on the web ad 120-2 for the Dominos® website, the mobile computing device 100 opens the Dominos® website in the web browser (e.g., www.dominos.com).

Figure 2A:
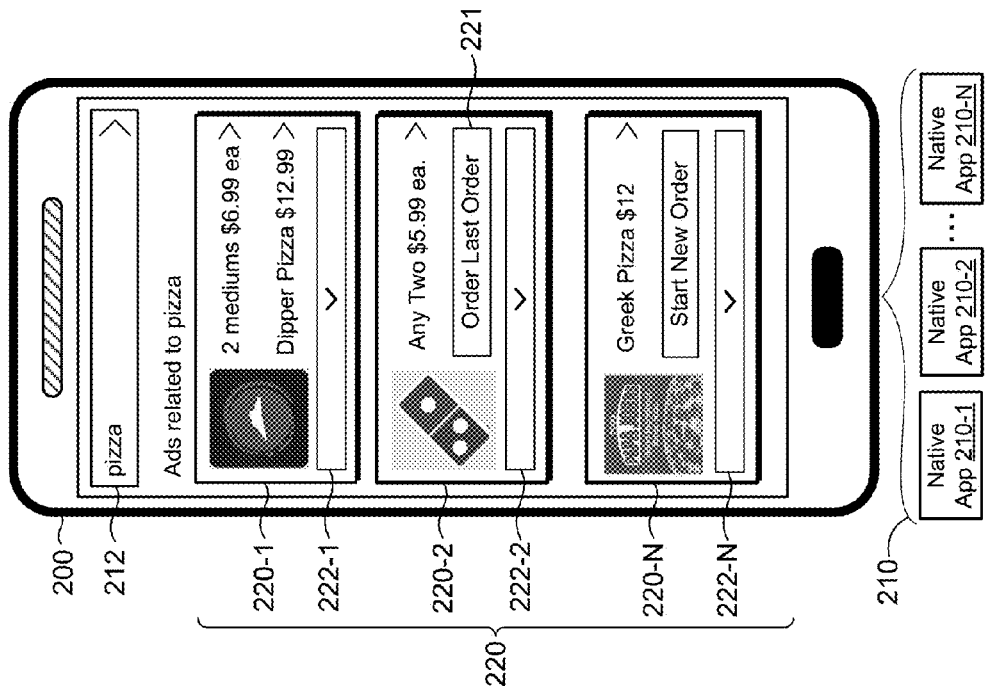
FIG. 2A is a schematic diagram of a client computing device displaying ads in the form of application cards.

FIG. 2A illustrates an example client computing device 200. The client computing device 200 includes a computing processor and a non-transitory memory that stores native applications 210. One of the native applications 210 may include a search application that enables a user of the client computing device 200 to provide a search query 212. The client computing device 200 transmits the search query 212 to a server (e.g., ad server 310 shown in FIG. 3). Upon transmitting the search query 212, the client computing device 200 receives one or more card objects (e.g., card object 490 shown in FIGS. 2B and 3). The client computing device 200 uses the card objects to display ads in the form of application cards 220 instead of the clickable hyperlinks. The application cards 220 include graphical user interface (GUI) elements that enable the user to perform a task (e.g., order a pizza).

The application cards 220 may correspond with the native applications 210. For example, an application card 220 may serve as a front-end user interface for a corresponding native application 210. The application cards 220 may interact with their corresponding native applications 210 to perform a function that the native application 210 is capable of performing. The application cards 220 may interact with their corresponding native applications 210 by making API calls. The application cards 220 may use data stored in their corresponding native applications. For example, the application card 220-2 may display a button 221 that enables the user to order the same pizza as the user ordered last time using the corresponding native application 210-2.

Alternatively, the application cards 220 may operate independent of the native applications 210. Application cards 220 that operate independent of the native applications 210 may include additional executable instructions that the computing processor can execute. The application cards 220 may interact with a server (e.g., web server or application server) to perform the task associated with the application card. For example, an application card 220 may make API calls to a web server (e.g., a web application or a website). The application cards 220 may transmit data to the server using POST requests and receive data from the server using GET requests. The application cards 220 can use other types of RESTful (Representational State Transfer) protocols. Alternatively, the application cards 220 may use AJAX (asynchronous JavaScript and XML) or other types of background service to communicate with the server.

The application cards 220 may include an expand button 222 that can be selected to expand the application card 220. FIG. 2B illustrates expanded versions of the application cards 220 and their corresponding card objects 490. The application cards 220 may include a card label 224. The card label 224 may be the same as the application name of the corresponding native application. The application cards 220 may include a card image 226. The card image 226 may be the same as the application logo of the corresponding native application. The application cards 220 may include additional GUI elements 228 that enable the user to perform the task associated with the application card 220 without launching a corresponding native application 210 or a website. The GUI elements 228 may include radio buttons, drop-downs, push buttons, sliders, or any other suitable GUI elements. The GUI elements 228 may be used to launch the corresponding native application or website.

The client computing device 200 may receive the card objects 490 in response to transmitting a search query. The client computing device 200 may use the card objects 490 to render to the application cards 220. The card object 490 may be a data container that stores the information that is displayed by the application cards 220. For example, the card objects 490 may be JSON files. Alternatively, the card objects 490 may be in XML. The card objects 490 may include attribute-value pairs. The attribute-value pairs store information that the client computing device 200 may use to render the application cards 220. The card object 490 may include a card-label attribute 491 that indicates the card label 224. The card object 490 may include a card-image attribute 492 that indicates the card image 226. The card-image attribute 492 may indicate the card image 226 by including a web address to the card image 226. The card object 490 may include other attributes, such as a video (e.g., a streaming video) and an audio (e.g., a streaming audio feed).

The card object 490 may include a GUI elements attribute 493 that indicates the GUI elements 228 that the client computing device 200 may display in the application cards 220. The card object 490 may include an executable-instructions attribute 494 that indicates the executable instructions that the client computing device 200 may execute to render the application card 220 and/or perform the task associated with the application card. The executable-instructions attribute 494 may store the executable instructions or include a web link that indicates where the client computing device 200 can retrieve the executable instructions from.

The card object 490 may include an access-mechanism attribute 495 that indicates an access mechanism for the application card 220 to access the functionality associated with the application card 220. The access-mechanism attribute 495 may refer to a corresponding native application. For example, the access-mechanism attribute 495-2 refers to the Domino's Pizza® native application. Since the access-mechanism attribute 495-2 refers to the Domino's Pizza® native application, the application card 220-2 may access the Domino's Pizza® native application to provide the functionality of ordering a pizza from Domino's Pizza®. For example, the application card 220-2 may make API calls to the Domino's Pizza® native application.

Alternatively, the access-mechanism attribute 495 may refer to a corresponding web application (e.g., website). For example, the access-mechanism attribute 495-3 refers to the PapaJohns® website. Since the access-mechanism 495-3 refers to the PapaJohns® website, the application card 220-3 may communicate with the PapaJohns® website to provide the functionality of ordering a pizza from PapaJohns®. For example, the application card 220-3 may make API calls to the PapaJohns® website or the application card 220-3 may transmit POST requests and receive GET requests from the PapaJohns® website.

The card object 490 may include a card-layout attribute 496 that indicates a layout for the application card 220. The card-layout attribute 496 may specify the font, size and/or positioning of the card label 224, the card image 226 and/or the GUI elements 228. The card-layout attribute 496 may specify a layout file. The layout file may be stored on the client computing device 200. Alternatively, the layout file may be stored on a server and the client computing device 200 may retrieve the layout file from the server.

Figure 3:
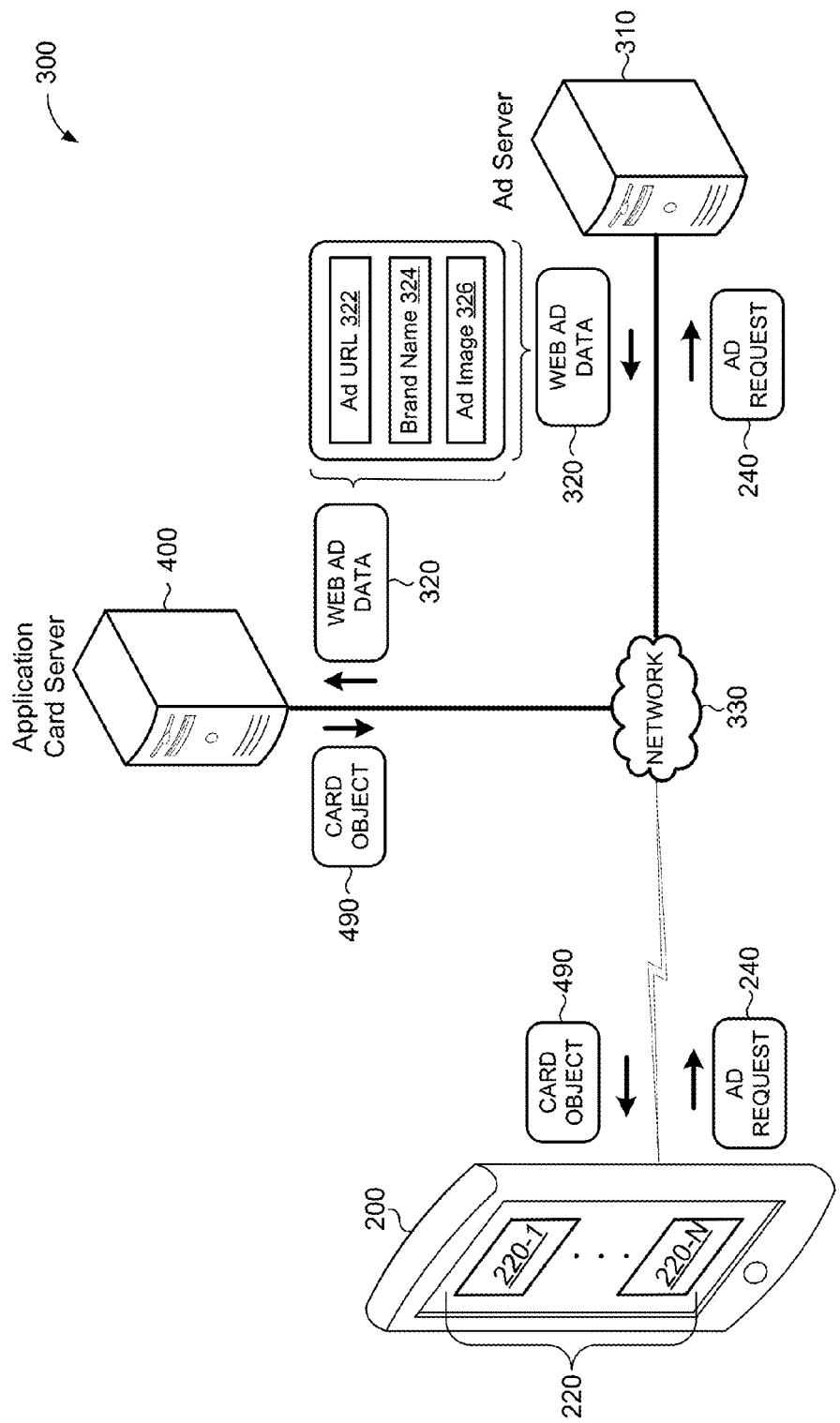
FIG. 3 is a schematic diagram of a system for determining card objects based on web ads.

FIG. 3 illustrates a system 300 for providing advertisements in the form of application card objects (hereinafter, card objects). The system 300 includes the client computing device 200, an ad server 310, a network 330 and an application card server 400 (hereinafter, card server 400). The client computing device 200 transmits an ad request 240 to the ad server 310. The ad server 310 receives the ad request 240 and identifies a web ad based on the ad request 240. For example, the ad server 310 may identify the web ads 120 shown in FIG. 1. The ad server 310 indicates the web ad to the card server 400 by transmitting web ad data 320. The card server 400 receives the web ad data 320 and determines an application card object 490 (hereinafter, card object 490) based on the web ad data 320. The card server 400 transmits the card object 490 to the ad server 310 and/or the client computing device 200. The client computing device 200 uses the card object 490 to display the application card 220.

The ad request 240 may include data that triggers an ad. For example, an ad request 240 may include a search query (e.g., the search query 212 shown in FIG. 2A) and/or contextual data. Contextual data can refer to data that indicates a context of the client computing device 200 and/or a user of the client computing device 200. The contextual data may include sensor measurements captured by sensors of the client computing device 200. Example sensor measurements include a location of the client computing device 200, an accelerometer reading, an ambient sound level, an ambient lighting level, or the like. The contextual data may indicate native applications installed on the client computing device 200. The contextual data may indicate an application being displayed by the client computing device 200 (e.g., an onscreen or active application).

The ad server 310 receives the ad request 240 and determines a web ad based on the ad request 240. In some implementations, the ad request 240 includes a search query with one or more search terms. The ad server 310 may store web ads and their associated keywords. The ad server 310 may identify a stored keyword in the search terms and select the web ad associated with the keyword. For instance, the ad server 310 may utilize an inverted index that indexes keywords to stored web ads in order to select web ads. Additionally or alternatively, the ad server 310 may store web ads and their associated entities. The ad server 310 may identify a stored entity in the search terms and select the web ad associated with the identified entity. The ad server 310 may store web ads and their associated contextual triggers. The ad server 310 may compare the contextual data in the ad request 240 with the contextual triggers and select the web ad based on the comparison. For example, a web ad for Pizza Hut® may include a Dominos Pizza® location as a trigger. When the contextual data indicates that the client computing device 200 is near the Dominos Pizza® location, the ad server 310 may select the web ad for Pizza Hut®. The foregoing are provided as examples of selecting web ads. The ad server 310 may utilize additional or alternative web ad selection techniques including geo-targeting, demographic targeting, and/or random ad selection.

The web ad data 320 identifies the web ad determined by the ad server 310. The web ad data 320 may include hypertext markup language (HTML). The web ad data 320 may include an ad uniform resource locator (URL) 322 that refers to a website address of the advertised website. The web ad data 320 may include the ad URL 322 in a href attribute of an <a> tag. For example, the web ad data 320 for a web ad referring to the PizzaHut.com® website may include an ad URL 322 that points to the PizzaHut.com® website. In this example, clicking on the ad URL 322 launches the PizzaHut.com® website. The ad URL 322 may point to the advertised website directly by specifying a web address of the advertised website. For example, the href attribute may specify "PizzaHut.com"®. Alternatively, the ad URL 322 may refer to the advertised website indirectly. For example, the ad server 310 may use the ad URL 322 to identify the advertised website, track a number of clicks and re-direct the user to the advertised website.

In addition to including the ad URL 322 or as an alternative, the web ad data 320 may include a string that identifies the advertised website. For example, the string may include a brand name 324 that refers to the advertised website. In the example of PizzaHut.com®, the brand name 324 may include "Pizza Hut"®. The web ad data 320 may include a pair of tags (e.g., <a> tags) and the brand name 324 may be included between the tags. The web ad data 320 may indicate an ad image 326 that is associated with the advertised website. The ad image 326 may be a brand logo of the advertised website. In the example of PizzaHut.com®, the ad image 326 may refer to the PizzaHut® logo. The web ad data 320 may include an <img> tag that indicates the ad image 326. The <img> tag may include a src attribute that specifies a URL for the ad image 326.

The ad server 310 transmits the web ad data 320 to the card server 400 via the network 330. The network 330 may refer to the Internet. The network 330 may include a wireless cellular communication network (e.g., Long Term Evolution (LTE)). The network 330 may include a wired communications network (e.g., Ethernet). The network 330 may include a Local Area Network (LAN), a Wide Area Network (WAN), a Wireless Local Area Network (WLAN), or the like. The ad server 310 and the card server 400 may be operated by different organizations. For example, the ad server 310 may be operated by a search engine operator (e.g., Yahoo®, Google® or Microsoft®) and the card server 400 may be operated by an application card provider (e.g., Quixey®). Alternatively, the ad server 310 and the card server 400 may be operated by the same organization. The ad server 310 and the card server 400 may be co-located in the same data center or server rack.

Figure 4:
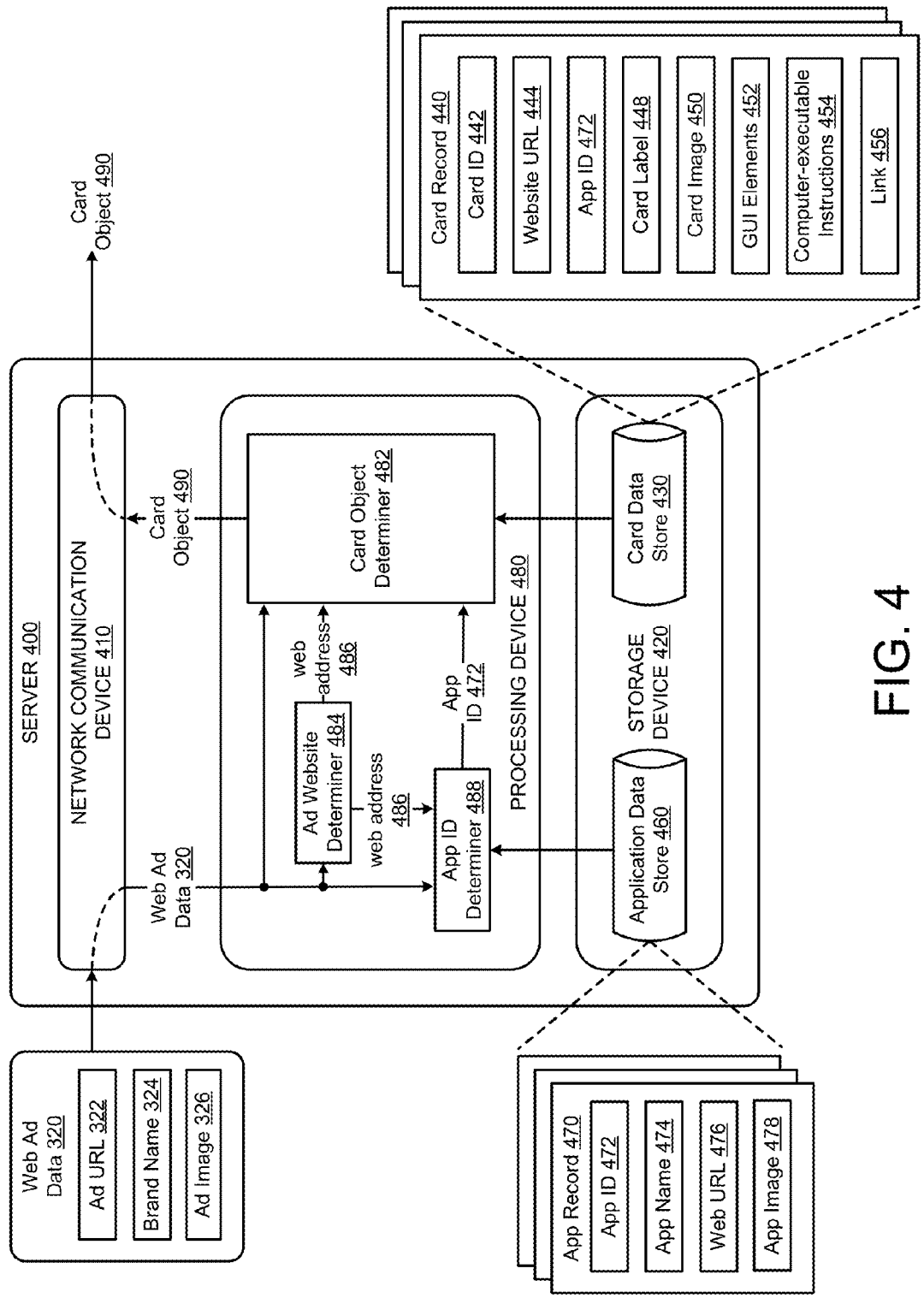
FIG. 4 is a block diagram of a card server that determines card objects based on web ad data.

FIG. 4 illustrates an example card server 400 according to some implementations of the present disclosure. The card server 400 receives the web ad data 320 and determines a card object 490 based on the web ad data 320. The card server 400 includes a network communication device 410, a storage device 420 and a processing device 480. The card server 400 may be implemented by a cloud computing platform. The cloud computing platform may include a collection of remote computing services. The cloud computing platform may include computing resources (e.g., processing device 480). The computing resources may include servers (e.g., physical servers or virtual servers). The cloud computing resources may include storage resources (e.g., storage device 420). The storage resources may include database servers that support NoSQL, MySQL, Oracle, SQL Server, or the like. The cloud computing platform may include networking resources (e.g., network communication device 410). For example, the networking resources may distribute incoming requests for event notifications across multiple virtual private servers. Example cloud computing platforms include Amazon Web Services®, Google Cloud Platform®, Microsoft AZURE™ and Alibaba Aliyun™.

The network communication device 410 communicates with a network (e.g., the network 330 shown in FIG. 3). The network communication device 410 may include a communication interface that performs wired communication (e.g., via Ethernet, Universal Serial Bus (USB) or fiber-optic cables). The network communication device 410 may perform wireless communication (e.g., via Wi-Fi, a cellular network, or satellites). The network communication device 410 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE) or LTE-Advanced). The transceiver may operate in accordance with a Universal Serial Bus (USB) specification (e.g., via a USB port).

The storage device 420 stores data. The storage device 420 may include one or more computer readable storage mediums. For example, the storage device 420 may include solid state memory devices, hard disk memory devices, optical disk drives, read-only memory and/or nanotube-based storage devices. The storage device 420 may be connected to the processing device 480 via a bus and/or a network. Different storage mediums within the storage device 420 may be located at the same physical location (e.g., in the same data center, same rack, or same housing). Different storage mediums of the storage device 420 may be distributed (e.g., in different data centers, different racks, or different housings). The storage device 420 may implement (e.g., store) a card data store 430 and an application data store 460.

The card data store 430 stores card records 440. A card record 440 may include a card ID 442 that identifies the card record 440. The card record 440 may include a website URL 444 that identifies a corresponding website. The card record 440 may include an app ID 472 that identifies a corresponding application. The card record 440 may include a card label 448, a card image 450 and/or GUI elements 452 that can be displayed in the application card. The card record 440 may include computer-executable instructions 454 that can be executed by a client computing device.

The card records 440 can be used to display application cards (e.g., application cards 220 shown in FIGS. 2A, 2B and 3). For example, upon execution, the computer-executable instructions 454 render an application card that displays the card label 448, the card image 450 and/or the GUI elements 452. The computer-executable instructions 454 may reference application programming interfaces (APIs) and may make API calls upon selection of certain GUI elements 452 (e.g., upon button presses). The card record 440 may include a link 456 that can be used to access the card record 440. The link 456 may include a uniform resource identifier (URI) or a URL for the card record 440. For example, the link 456 may include the card record ID 442.

The application data store 460 stores application records 470. The application records 470 may correspond with applications that can be downloaded by client computing devices. An application record 470 may include an app ID 472 that identifies the application and an app name 474 that refers to a name of the application. The application record 470 may include a web URL 476 that points to a website associated with the application. For example, the application record 470 may correspond with a Pizza Hut® application and the web URL 476 may refer to the PizzaHut.com website. The application record 470 may include an app image 478 associated with the application and/or the corresponding website indicated by the web URL 476. The app image 478 may be a logo for the application and/or the corresponding website indicated by the web URL 476.

The processing device 480 may include a collection of one or more computing processors that execute computer readable instructions. The computing processors of the processing device 480 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 480 executes a card object determiner 482. The processing device 480 may execute the card object determiner 482 by executing computer-readable instructions corresponding with the card object determiner 482.

The card object determiner 482 determines a card object 490 based on the web ad data 320. The card object determiner 482 identifies a suitable card record 440 based on the web ad data 320. Upon identifying the card record 440, the card object determiner 482 may generate the card object 490 by constructing a data container (e.g., JSON file) to store the information included in the card record 440. The card object determiner 482 may identify the card record 440 by utilizing an inverted index that indexes the website URLs 444, the card labels 448 and/or the card images 450 to the card records 440. The card object determiner 482 may utilize the inverted index by comparing the web ad data 320 with data items in the inverted index and selecting a suitable card record 440 based on the comparison.

The card object determiner 482 may compare the ad URL 322 with indexed website URLs 444. Upon detecting a match between the ad URL 322 and a particular website URL 444, the card object determiner 482 retrieves the card record 440 associated with that particular website URL 444 to generate the card object 490. Similarly, the card object determiner 482 may compare the brand name 324 with the indexed card labels 448. Upon detecting a match between the brand name 324 and a particular card label 448, the card object determiner 482 retrieves the card record 440 associated with the particular card label 448 to generate the card object 490. Likewise, the card object determiner 482 may compare the ad image 326 with indexed card images 450. Upon detecting a match between the ad image 326 and a particular card image 450, the card object determiner 482 retrieves the card record 440 associated with that particular card image 450 to generate the card object 490.

In some examples, the ad URL 322 does not explicitly specify the web address for the advertised website. For example, the ad URL 322 may be an intermediate URL that is used by an ad server to track the number of ad clicks and then redirect to the advertised website. The processing device 480 may execute an ad website determiner 484 that determines (e.g., identifies) a web address 486 for the advertised website based on the web ad data 320. The ad website determiner 484 may determine the web address 486 based on the ad URL 322 included in the web ad data 320. The web address 486 may be the same as the ad URL 322, for example, when the ad URL 322 directly points to the advertised website. The ad website determiner 484 may invoke the ad URL 322 to identify the web address 486 for the advertised website. Invoking the ad URL 322 may launch the advertised website and the ad website determiner 482 can capture the web address 486 of the launched website. The card object determiner 482 may compare the website URLs 444 with the web address 486 instead of the ad URL 322, for example, when the web address 486 is different from the ad URL 322.

In some implementations, the processing device 480 executes an app ID determiner 488 that determines an app ID 472 based on the web ad data 320 and/or the web address 486. The advertised website may be associated with a corresponding application that can be downloaded by mobile computing devices. For example, the PizzaHut-.com® website may be associated with a corresponding Pizza Hut® application that can be downloaded by client computing devices. The app ID 472 identifies the application corresponding with the advertised website. The app ID determiner 488 may compare the ad URL 322 or the web address 486 with the web URLs 476. Upon detecting a match with a particular web URL 476, the app ID determiner 488 selects the app ID 472 associated with that particular web URL 476.

The app ID determiner 488 may determine the app ID 472 by comparing the brand name 324 with the app names 474. Upon detecting a match with a particular app name 474, the app ID determiner 488 may select the app ID 472 associated with that particular app name 474. The app ID determiner 488 may determine the app ID 472 by comparing the ad image 326 with the app images 478. Upon detecting a match with a particular app image 478, the app ID determiner 488 may select the app ID 472 associated with that particular app image 478.

The card object determiner 482 may determine the card object 490 based on the app ID 472 determined by the app ID determiner 488. For example, the card object determiner 482 retrieves the card record 440 associated with the app ID 472 determined by the app ID determiner 488. The card object determiner 482 may use the retrieved card record 440 to generate the card object 490. The card object determiner 482 transmits the card object 490 via the network communication device 410. The card object determiner 482 may transmit the card object 490 to the ad server 310 and/or the client computing device 200 shown in FIG. 3.

As an alternative to transmitting the card object 490 or in addition to transmitting the card object 490, the card object determiner 482 may transmit a link for the card object 490. For example, the card object determiner 482 may retrieve the link 456 from the card data store 430 and transmit the link 456. The link 456 may be used at a client computing device to access the card record 440. The link 456 may identify the card record 440 corresponding with the card object 490. For example, the link 456 may include a uniform resource identifier (URI) that identifies the card record 440. Additionally or alternatively, the link 456 may include the card ID 442. As an alternative to retrieving the link 456 from the card data store 430, the card object determiner 482 may generate (e.g., construct) the link for the card object 490. For example, the card object determiner 482 may use the card ID 442 to generate the link. The card object determiner 482 may transmit the link using JavaScript Object Notation (JSON).

In the example of transmitting the link 456, the card object determiner 482 may receive an input (e.g., a user input) that indicates an invocation (e.g., selection) of the link 456 at a client computing device. In response to detecting the invocation of the link 456, the card object determiner 482 retrieves a corresponding card record 440 from the card data store 430. The card object determiner 482 generates the card object 490 using the retrieved card record 440 and transmits the card object 490 to the client computing device. Advantageously, transmitting the link 456 prior to transmitting the card object 490 may alleviate network congestion.

As an alternative to determining the card object 490 based on the card records 440 stored in the card data store 430, the card object determiner 482 may generate (e.g., construct) the card object 490 based on the web ad data 320. The card object determiner 482 may store the generated card object 490 as a card record 440 in the card data store 430. The card object determiner 482 may select the brand name 324 as the card label 448. The card object determiner 482 may select the ad image 326 as the card image 450. The card object determiner 482 may scrape the advertised website indicated by the ad URL 322 for additional information and include the scraped information in the card object 490. The card object determiner 482 may generate the card object 490 when the card object determiner 482 is unable to identify a suitable card record 440 from the card data store 430.

Figure 5:
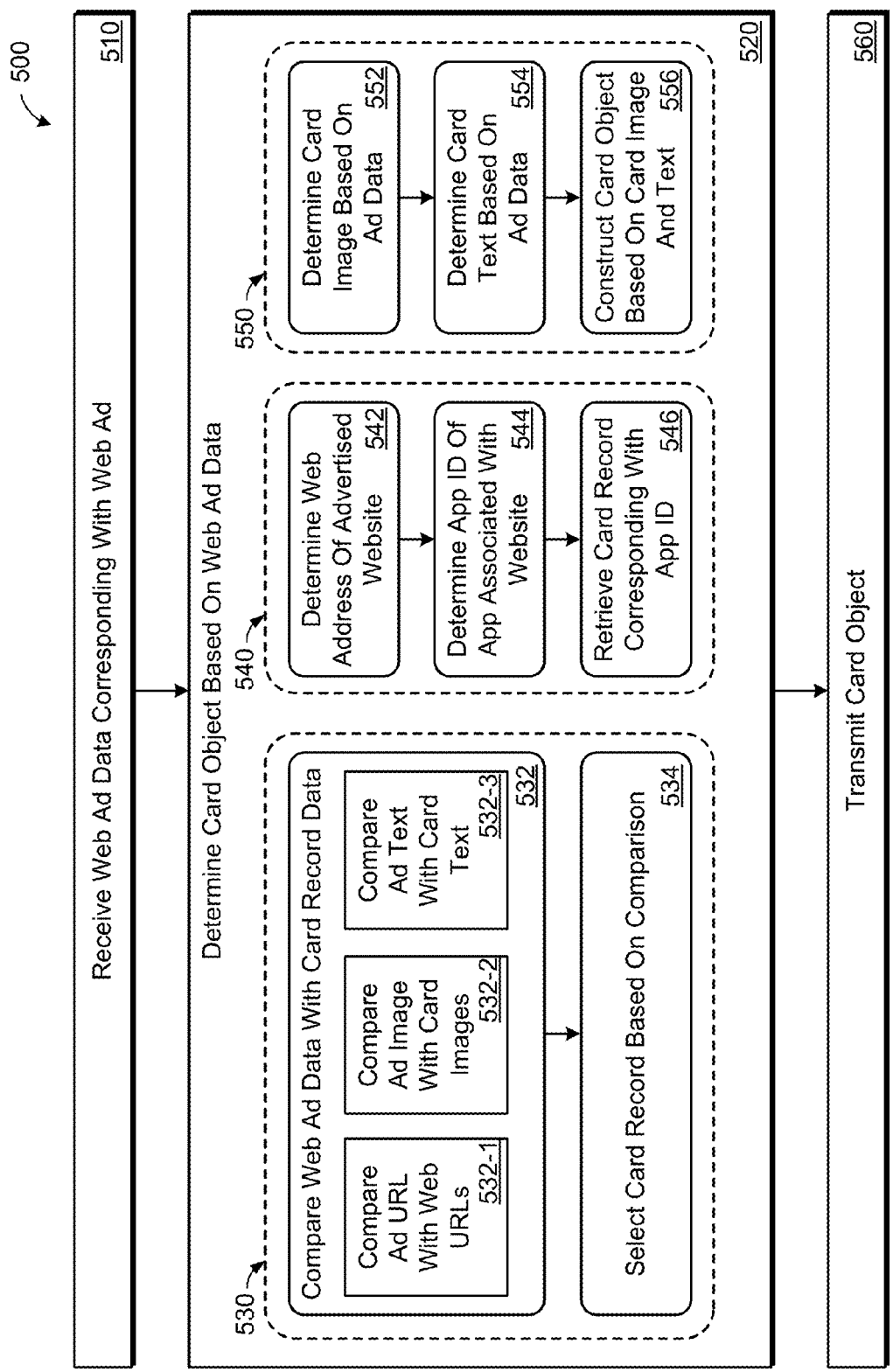
FIG. 5 is a block diagram of an example method for determining the card objects based on web ad data.

FIG. 5 illustrates an example set of operations of a method 500 for providing card objects. At 510, a card server receives web ad data corresponding with a web ad. The card server may receive the web ad data from an ad server that determined the web ad in response to an ad request from a client computing device. Alternatively, the card server may receive the web ad data from a client computing device that received the web ad data from the ad server. The web ad data may include an ad URL. Additionally, the web ad data may include text (e.g., a brand name or a trade name) and an ad image. For example, referring to FIG. 3, the card server 400 receives the web ad data 320.

At 520, the card server determines a card object based on the web ad data. FIG. 5 illustrates example methods 530, 540 and 550 for determining the card object. The card server may store card records that include card record data. The card record data may indicate a web URL for a website associated with the card record. Additionally or alternatively, the card record data may include a card image and card text (e.g., card label). For example, the card server may store the card records 440 illustrated in FIG. 4.

Referring to the method 530, the card server may determine the card object by comparing the web ad data with the card record data, at 532. Blocks 532-1, 532-2 and 532-3 illustrate different information that the card server can compare. For example, at 532-1, the card server may compare the ad URL with the web URLs stored in the card records. The card server may compare the ad URL with the web URLs by utilizing an inverted index that indexes the web URLs to the card records. The card server may compare the ad URL and the web URLs by computing a Levenshtein distance between the ad URL and each web URL. Similarly, at 532-2, the card server may compare the ad image with the card images stored in the card records. The card server may employ a suitable image comparison technique to compare the ad image with the card images. For example, the card server may compute an image similarity score (e.g., a structural similarity (SSIM) index) to indicate the similarity between the ad image and a particular card image. Likewise, at 532-3, the card server may compare ad text with card text. For example, the card server may compare a brand name indicated by the ad text with a card label. The card server may compare the brand name and the card labels by computing a Levenshtein distance between the brand name and each card label.

At 534, the card server selects a card record based on the comparison between the web ad data and the card records in the card data store. In some implementations, the card server selects a particular card record to generate the card object in response to the Levenshtein distance associated with the particular card record being the lowest or below a text difference threshold. Additionally or alternatively, the card server may select a particular card record to generate the card object in response to the image similarity score associated with the particular card record being the highest or above an image similarity threshold.

The method 540 may use application records (e.g., application records 470 shown in FIG. 4) to determine the card object. At 542, the card server determines a web address of the advertised website. The web address may be the same as the ad URL, for example, when the ad URL explicitly specifies the web address of the advertised website. However, the web address may be different from the ad URL when the ad URL includes an intermediate URL that is used to track ad clicks and redirect to the advertised website. The card server may invoke the ad URL to determine the web address of the advertised website.

At 544, the card server determines an app ID (e.g., app ID 472 shown in FIG. 4) of a native application associated with the advertised website. The card server may determine the app ID by comparing the web address of the advertised website with web URLs (e.g., web URLs 476 shown in FIG. 4) associated with stored app IDs. The card server may utilize an inverted index that indexes the web URLs to application records. The card server may determine Levenshtein distances between the web address and each web URL. The card server may select an app ID in response to the app ID being associated with the lowest Levenshtein distance. Alternatively, the card server may scrape the advertised website to determine the app ID by identifying an app (e.g., a native application) associated with the advertised website.

At 546, the card server retrieves the card record corresponding with the app ID. The card server may utilize an inverted index that indexes app IDs to card records. Alternatively, the card server may compare the app ID determined at 544 with app IDs stored in the card records. The card server may select a particular card record to generate the card object in response to the app ID associated with that particular card record matching the app ID determined at 544. For example, the card server may select a card record in response to the Levenshtein distance between the app ID associated with that card record and the app ID determined at 544 being lower than a threshold distance (e.g., being equal to zero).

The card server may retrieve different card records based on the native applications installed at the client computing device. As described in relation to FIGS. 2A-B, some application cards may interface with native applications installed at the client computing device while other application cards may operate independently. The card server may receive contextual data that indicates app IDs of installed applications at the client computing device. The card server may compare the app IDs in the contextual data with the app ID determined at 544. If the client computing device includes the native application associated with the advertised website, then the card server may retrieve a card record that may be used to display an application card that interfaces with the native application. However, if the client computing device does not include the native application associated with the advertised website, then the card server may retrieve a different card record that may be used to display an application card that operates independently.

Referring to the method 550, the card server may determine (e.g., construct) the card object based directly on the web ad data. The card server may employ the method 550 upon determining that the card data store does not store a card record that matches the web ad data. At 552, the card server may determine (e.g., identify) the card image based on the web ad data. For example, the web ad data may indicate a URL for an ad image. The card server may retrieve the ad image using the URL and use the retrieved image as the card image. The ad image may be stored on a web server that is hosting the advertised website. The card server may issue a HTTP request (e.g., a POST request) to the web server using the URL and receive the ad image from the web server in response to issuing the HTTP request (e.g., via a GET request).

At 554, the card server may determine the card text based on the web ad data. For example, the card server may determine a card label based on the web ad data. The web ad data may include a string between a pair of <a> tags. The card server may extract the string from between the <a> tags and use the extracted string as the card label.

At 556, the card server constructs the card object based on the card image and the card text. The card server may scrape additional information from the advertised website and use the scraped information to construct the card object. The card server may construct the card object by generating a JSON file or an XML file that indicates that card label and the card image. Additionally, the card server may generate a card record based on the card image determined at 552 and the card text determined at 554. The card server may store the generated card record in the card data store.

At 560, the card server transmits the ad card object. The card server may transmit the ad card object to the ad server that generated the web ad and/or the client computing device that placed the ad request. Additionally or alternatively, the card server may transmit a link to the card object instead of transmitting the card object. The card server may receive an input indicating that the link has been invoked. The card server may transmit the card object in response to the link being invoked.

The method 500 of FIG. 5 is provided for example. Additional and/or alternate operations may be included in the method 500 without departing from the scope of the disclosure. For example, the card server may utilize associated metadata or identified entities (e.g., books, products, such as movies, songs, toys, clothes, etc.) within an advertisement URL to determine the card object (at 520). The card server may identify entities based on parameters in an advertisement URL. For example, a portion of the advertisement URL may specify a product ID or an ISBN (International Standard Book Number). Upon identifying the product ID, the card server can retrieve a card object for the product identified by the product ID. Similarly, upon identifying the ISBN, the card server can retrieve a card object for the book identified by the ISBN. The card server may identify the entities or product IDs specified in the advertisement URL by comparing parameter values of the advertisement URL with entities or product IDs in an inverted index that indexes the entities or product IDs to card objects.

In some scenarios, the card server may identify a company name and a product ID specified in an advertisement URL. The card server can use the identified company name and/or the product ID to retrieve a corresponding card object. For example, given the following advertisement URL, the card server can determine that the advertisement relates to a product that has the following product ID.

Ad URL: http://www.amazon.com/Mattel-30188-Magic-8-Ball/dp/B00001ZWV7 product ID: B00001ZWV7

Upon determining the product ID, the card server can retrieve a card object that corresponds with the product ID.

Figure 6:
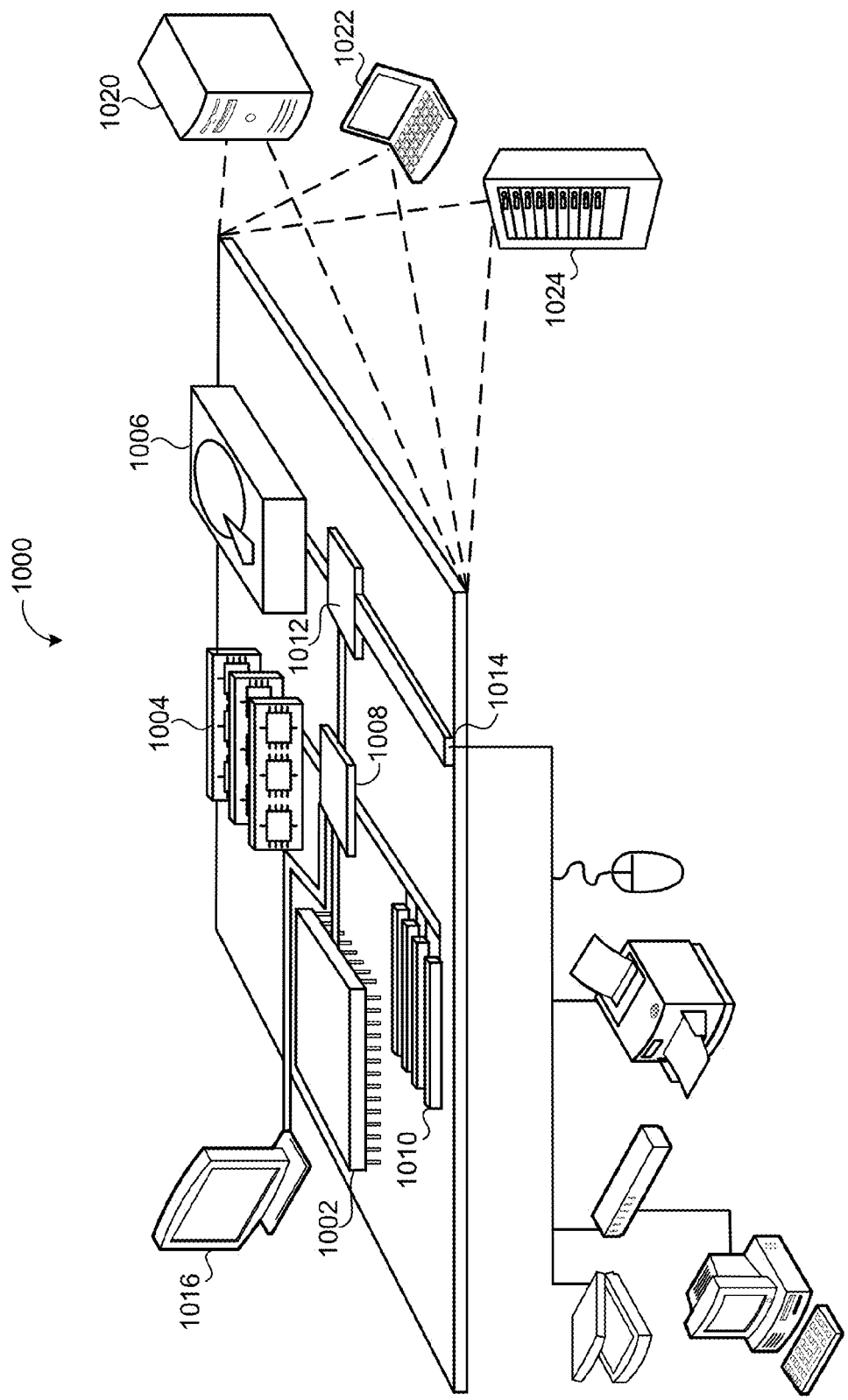
FIG. 6 is a schematic diagram of an example computing device that can be used to implement the client computing device, the ad server and/or the card server shown in FIG. 3.

FIG. 6 is a block diagram of an example computing device 1000 that may be used to implement the systems and methods described in this document. For example, the computing device 1000 may be used to implement the client computing device 200, the ad server 310 and/or the card server 400 shown in FIG. 3. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a graphical user interface (GUI) on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In some implementations, the storage device 1006 is a computer-readable medium. In various different implementations, the storage device 1006 may be a hard disk device, an optical disk device, or a tape device, a flash memory (e.g., a flash drive), a removable hard drive or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In some implementations, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer, such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. For example, a processor may include a graphics card as a vector processor. The processor may include additional or alternate processors (e.g., quantum processors). Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, a LED (light emitting diode) display, an OLED (organic light emitting diode) display, a plasma display or touch screen for displaying information to the user and optionally a keyboard and a pointing device, e.g., a mouse or a trackball, by which the user can provide input to the computer. The touch screen may be a capacitive touch screen, a resistive touch screen or any other type of touch screen (e.g., Frustrated Total Internal Reflection (FTIR)). Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A server comprising:
a network communication device;
a storage device storing a card data store that stores card records comprising:
a card identifier (ID) that identifies the card record;
a website uniform resource locator (URL) of a website associated with the card record; and
a card label, a card image and information about graphical user interface (GUI) elements displayable on an application card; and
a processing device that executes computer-readable instructions that, when executed by the processing device, cause the processing device to:
receive advertisement data corresponding with a web advertisement,
the advertisement data comprising an advertisement URL that refers to a website advertised by the web advertisement;
determine an advertisement card object based on the advertisement data by:
comparing the advertisement data with the card records stored in the card data store;
selecting a particular card record from the card data store based on the comparison; and
constructing a data container representing the advertisement card object, the data container indicating the card label, the card image and the GUI elements stored in the selected card record; and
transmit the advertisement card object via the network communication device,
wherein the selecting of the particular card record comprises:
receiving contextual data that indicates installed applications at a client computing device;
determining a native application corresponding with the web advertisement;
determining whether the native application is installed at the client computing device based on the contextual data;
retrieving a first card record from the card data store in response to the native application not being installed on the client computing device; and
retrieving a second card record from the card data store in response to the native application being installed on the client computing device.

2. The server of claim 1, wherein comparing the advertisement data with the card records comprises comparing the advertisement URL included in the advertisement data with the website URLs stored in the card records.

3. The server of claim 1, wherein:
the advertisement data further comprises an advertisement image; and
comparing the advertisement data with the card records comprises comparing the advertisement image included in the advertisement data with the card images stored in the card records.

4. The server of claim 1, wherein:
the advertisement data further comprises advertising text; and
comparing the advertisement data with the card records comprises comparing the advertising text included in the advertisement data with the card labels stored in the card records.

5. The server of claim 1, wherein transmitting the advertisement card object comprises:
generating a link for the advertisement card object; and
transmitting the link via the network communication device.

6. The server of claim 5, wherein the processing device is further configured to:
detect an invocation of the link; and
transmit the advertisement card object in response to detecting the invocation of the link.

7. The server of claim 1, wherein comparing the advertisement data with the card records comprises identifying an entity or a product ID specified in the advertisement URL; and wherein selecting the card record comprises selecting a card record corresponding with the entity or the product ID.

8. The server of claim 7, wherein identifying the entity of the product ID in the advertisement URL comprises comparing parameters of the advertisement URL with the entities or product IDs in an inverted index that indexes the entities of the product IDs to card objects.

9. A server comprising:
a network communication device;
a storage device storing a card data store that stores card records; and
a processing device that executes computer-readable instructions that, when executed by the processing device, cause the processing device to:
receive advertisement data corresponding with a web advertisement,
the advertisement data indicating:
an advertisement URL that refers to a website advertised by the web advertisement;
an advertisement image; and
advertising text;
compare the advertisement data with the card records stored in the card data store;
determine that the advertisement data does not match with the card records stored in the card data store;
in response to determining that the advertisement data does not match the card records stored in the card data store:
determine a card image based on the advertisement image;

determine a card label based on the advertising text; and
construct a data container representing an advertisement card object, the data container comprising the card image and the card label; and
transmit the advertisement card object via the network communication device,
wherein the card records further comprise application identifiers (IDs) that identify corresponding native applications,
wherein the storage device further comprises an application data store that stores application records comprising:
an application identifier (ID) that identifies a native application; and
a web URL corresponding with the native application; and
wherein a means for determining the advertisement card object comprise a computing processor that executes computer-readable instructions that, when executed by the computing processor, cause the computing processor to:
determine a web address of the advertised web site based on the advertisement URL;
determine an application ID of a native application associated with the advertised website by comparing the web address of the advertised website with the web URLs in the application data store;
retrieve a card record based on the determined application ID; and
construct the advertised card object based on information stored in the retrieved card record.

10. The server of claim 9, wherein determining the card image comprises:
identifying an image tag in the advertisement data;
identifying an image URL within the image tag;
retrieving the advertisement image using the image URL; and
selecting the advertisement image as the card image.

11. The server of claim 9, wherein determining the card label comprises:
identifying a pair of tags in the advertisement data;
extracting text stored between the pair of tags; and
selecting the extracted text as the card label.

12. The server of claim 9, wherein constructing the data container representing the advertisement card object comprises:
creating a JSON file; and
writing information indicating the card image and the card label to the JSON file.

13. The server of claim 9, wherein transmitting the advertisement card object comprises:
generating a link to the advertisement card object; and
transmitting the link.

14. The server of claim 13, wherein the processing device is further configured to:
detect an activation of the link; and
transmit the advertisement card object in response to detecting the activation of the link.

15. The server of claim 9, wherein the processing device is further configured to:
generate a card record in the card data store; and
populate the generated card record with the advertisement URL, the determined card image and the determined card label.

16. A server comprising:
a storage device comprising a card data store that stores card records comprising:
a card identifier (ID) that identifies the card record;
a website uniform resource locator (URL) of a website associated with the card record; and
a card label, a card image and information about graphical user interface (GUI) elements displayable on an application card;
a network communication device that is configured to:
receive advertisement data corresponding with a web advertisement,
the advertisement data comprising an advertisement URL that refers to a website advertised by the web advertisement; and
transmit an advertisement card object in response to receiving the advertisement data, the advertisement card object indicating the card label, the card image and the GUI elements of at least one of the card records; and
means for determining the advertisement card object based on the advertisement data,
wherein the card records further comprise application identifiers (IDs) that identify corresponding native applications,
wherein the storage device further comprises an application data store that stores application records comprising:
an application identifier (ID) that identifies a native application; and
a web URL corresponding with the native application; and
wherein the means for determining the advertisement card object comprise a computing processor that executes computer-readable instructions that, when executed by the computing processor, cause the computing processor to:
determine a web address of the advertised website based on the advertisement URL;
determine an application ID of a native application associated with the advertised website by comparing the web address of the advertised website with the web URLs in the application data store;
retrieve a card record based on the determined application ID; and
construct the advertised card object based on information stored in the retrieved card record.

17. The server of claim 16, wherein the means for determining the advertisement card object comprise a computing processor that executes computer-readable instructions that, when executed by the computing processor, cause the computing processor to:
compare the advertisement data with the card records stored in the card data store;
select a card record from the card data store based on the comparison; and
construct a data container representing the advertisement card object, the data container indicating the card label, the card image and the GUI elements stored in the selected card record.

18. The server of claim 16, wherein the means for determining the advertisement card object comprise a computing processor that executes computer-readable instructions that, when executed by the computing processor, cause the computing processor to:
determine a web address of the advertised website based on the advertisement URL;
retrieve a card record corresponding with the web address; and
generate the advertisement card object based on information stored in the retrieved card record.

19. The server of claim 16, wherein the means for determining the advertisement card object comprise a computing processor that executes computer-readable instructions that, when executed by the computing processor, cause the computing processor to:
   determine a card image based on the advertisement data;
   determine a card label based on the advertisement data; and
   construct a data container representing the advertisement card object, the data container indicating the card image and the card label.

20. The server of claim 16, wherein the means for determining the advertisement card object comprise a computing processor that executes computer-readable instructions that, when executed by the computing processor, cause the computing processor to:
   identify a card record from the card data store based on the advertisement data;
   create a JSON file; and
   populate the JSON file with information stored in the identified card record.

* * * * *